(No Model.) 2 Sheets—Sheet 1.

H. BROOKE.
APPARATUS FOR MANUFACTURING ARTICLES OF GLASS.

No. 588,318. Patented Aug. 17, 1897.

WITNESSES:

INVENTOR
Homer Brooke
BY
his ATTORNEY (No Model.) 2 Sheets—Sheet 2.

H. BROOKE.
APPARATUS FOR MANUFACTURING ARTICLES OF GLASS.

No. 588,318. Patented Aug. 17, 1897.

WITNESSES:
D. H. Hayward
Ernest Hopkinson

INVENTOR
Homer Brooke
BY Edwin H. Brown
his ATTORNEY

UNITED STATES PATENT OFFICE.

HOMER BROOKE, OF JERSEY CITY, NEW JERSEY, ASSIGNOR OF THREE-EIGHTHS TO JOHN C. GROUT, OF BROOKLYN, NEW YORK.

APPARATUS FOR MANUFACTURING ARTICLES OF GLASS.

SPECIFICATION forming part of Letters Patent No. 588,318, dated August 17, 1897.

Application filed January 14, 1897. Serial No. 619,142. (No model.)

*To all whom it may concern:*

Be it known that I, HOMER BROOKE, of Jersey City, in the county of Hudson and State of New Jersey, have invented a certain new and useful Improvement in Apparatus for Manufacturing Articles of Glass, of which the following is a specification.

I will describe my invention in detail and then point out the novel features in the claims.

Figure 1:
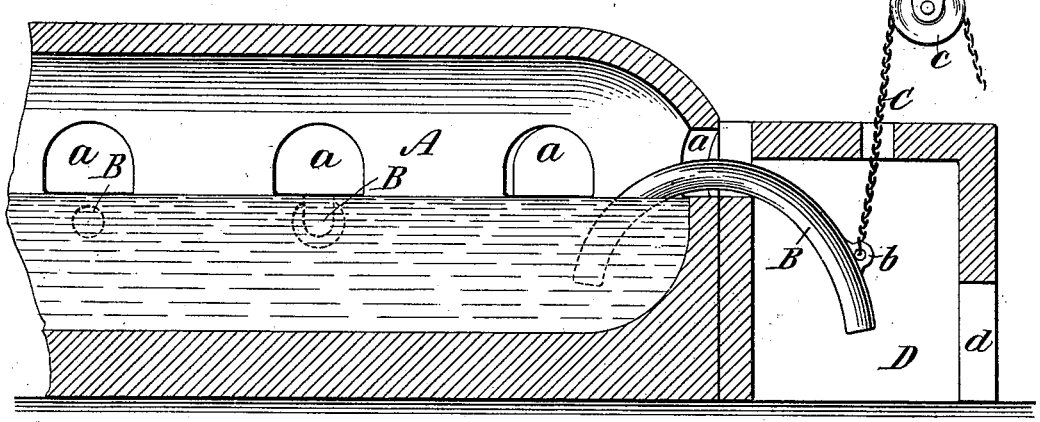
Figure 2:
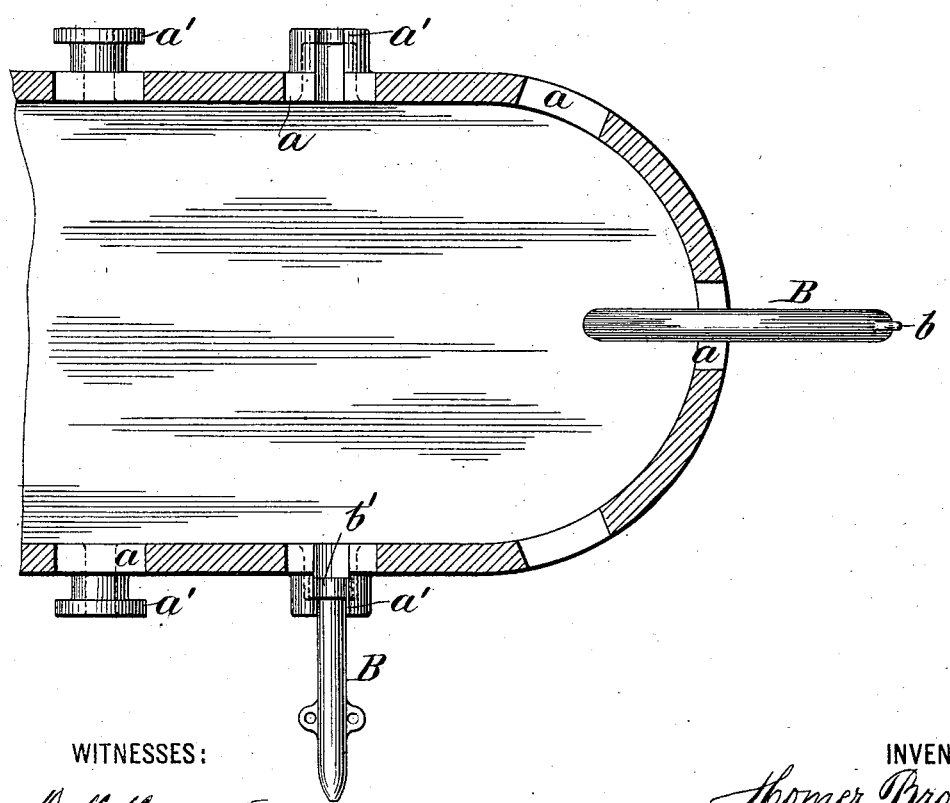
Figure 3:
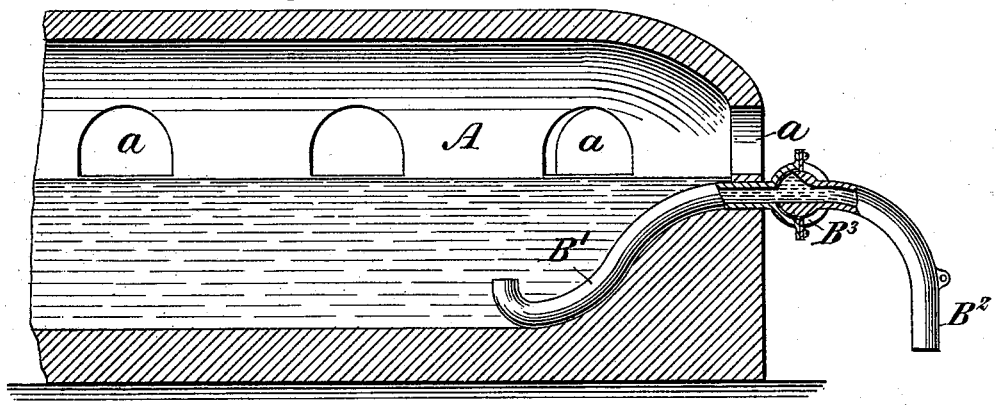
Figure 4:
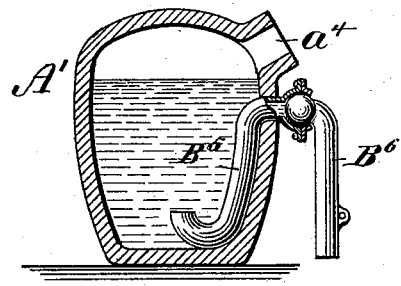
Figure 5:
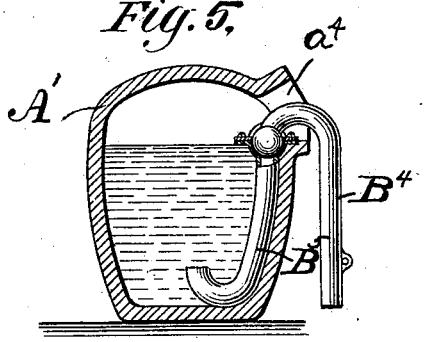

In the accompanying drawings, Figure 1 is a longitudinal vertical section of one end of a tank-furnace and appurtenances used in my improvement. Fig. 2 is a horizontal section of the same. Fig. 3 is a view similar to Fig. 1, illustrating a modification. Fig. 4 is a central vertical section of a crucible and appurtenances embodying my improvement. Fig. 5 is a view similar to Fig. 4, showing another modification.

Similar letters of reference designate corresponding parts in all the figures.

Referring first to Figs. 1 and 2, A designates a tank-furnace which may be made of the usual materials and of any appropriate construction, except as hereinafter explained. In its side wall or walls it is provided with openings $a$, which serve to permit of the escape of the products of combustion from the furnace after passing over the surface of the molten glass contained therein.

I provide a number of outlets B for the discharge of glass in a molten state. These may be coincident with the escape-openings $a$, but they need not bear this relation to the escape-openings, but may be on a lower level. In this example of my improvement I have shown these outlets B as in the form of tubes or pipes. As shown in this example of my improvement they constitute siphons, passing freely through the escape-openings $a$. The outer portions are shown as having lugs $b$, to which are attached chains C, passing around pulleys $c$ and adapted to be adjusted by hand or otherwise for the purpose of elevating the outer portions of the siphons. To lower the outer portions of the siphons, it will only be necessary to slacken the chains, for gravity will then make the desired adjustment. In this example of my improvement I have shown a chamber D, formed around the outer portion of the outlets B, which is represented in detail. The purpose of this chamber is to facilitate heating the outer portion of the outlets, so as to promote the flow of glass.

Where the outlets are in the form of longitudinally-adjustable tubes or siphons, the flow may be stopped by simply elevating the outer portions.

It will be seen that in the chamber D, opposite the outer extremity of the outlet B, is an opening $d$, through which may be introduced any device which is to be supplied with glass.

In Fig. 2 I have illustrated that the escape-openings may project outwardly and be provided with outwardly or inwardly turned flanges $a'$, and that where they have inwardly-turned flanges they may be made to engage with outwardly-extended flanges or collars $b'$ upon the outlets B. Of course these flanges $a'$ when turned inwardly would limit the upward movement as well as the outward movement of the outlets where these are made in the form of longitudinally-adjustable tubes. Obviously these flanges must not be continuous diaphragms obstructing the escape-openings $a$. A suitable construction is illustrated near the right-hand end of Fig. 1, and another is shown in said figure at the next escape-opening to the left.

The escape-openings are shown as projecting outwardly from the body of the tank-furnace, so as to be somewhat removed from the heat, and this is for the purpose of insuring that a certain quantity of glass placed in the escape-openings shall be in a plastic condition and not in a fluid condition. This condition of the glass in the openings is utilized for the purpose of securing some of the conduits B to the tank, said conduits being seated or embedded in the plastic glass, whereby an elastic connection is made between the conduits and the tank-furnace which permits of raising or lowering said conduits to control the flow of the molten glass.

It will be seen that the outlets B made in the form of siphons are in this example of my improvement below the top of the molten glass and above the bottom of the tank containing it. This is important in order that the settlings at the bottom may not be drawn off, and also that the scum at the top shall be left, to say nothing of the advantage of taking the glass from that portion of the tank where it is most uniformly molten.

In Fig. 3 I have shown that a siphon-outlet may be made by forming one portion integral with the tank and turning its inner extremity upward, so that it will take glass from the proper point in the tank, and that the outer section alone may be adjustable up and down to control the flow of the molten glass.

B' in this example of my improvement is that part of the siphon which is in the tank, and B² the adjustable section outside. A convex end on one part engaging with a concave end upon the other will make a serviceable joint. The adjustable part will preferably be supported in a yoke or cross-piece B³ in such manner as to permit of its adjustment up and down. Exposure of the joint to the air may be utilized to effect such chilling of the glass that it will not flow out, but will form a packing without solidifying so as to interfere with the adjustment of the outer section of the outlet and without checking the outward flow of the glass. I may also utilize this packing of plastic glass around or under the conduits B to obtain an elastic connection between said conduits and the tank-furnace, and, in fact, I desire to cover the use of a hot plastic glass wherever it is used to effect an elastic union between two parts, one or both of which is maintained in a heated condition. Here the outlets are entirely below the level of the escape-openings, and consequently, although made in the form of siphons, do not have the function of siphons, while the proper level of glass is maintained. Nevertheless, upon the lowering of the level of glass they would have the function of siphons. The raising of the level of the molten glass at any time would fill them so that they could, upon the lowering of the molten glass, operate as siphons.

The opening in the bend is for the purpose of allowing of the easy filling of the tube of the conduit B⁴ with molten glass to cause it to operate as a siphon, the stopper b² closing the opening.

In Fig. 4 I have shown my improvement applied to a crucible in substantially the same way that it is applied to a tank-furnace in Fig. 3. It will be seen that the opening a⁴ is above the outlet consisting of the sections B⁵ B⁶.

Fig. 5 is similar to Fig. 4, except that the joint between the two parts of the outlet is made inside the crucible instead of outside.

By my improvement I am able to remove glass from the most desirable part of the contents of a furnace or crucible and also to discharge it with any desired control. Thus I may discharge it at any desired flow upon the end of a blow pipe or rod, with the advantage of depositing it on exactly that portion where it is desired, and not elsewhere, and in proper quantity.

The outlets may, of course, be used for discharging glass into molds or into any devices where it is to remain or over a flat surface to produce plates of glass.

In using the term "tube" or "pipe" as constituting an outlet I mean to include not merely complete tubes or complete pipes, but any segments of tubes or pipes, or any gutters of any kind answering the same purpose, or any structure which is for part of its length a complete tube or pipe and in part a gutter.

When I speak in the specification and claims of "adjusting the conduit," I mean both adjusting the whole thereof, as in Figs. 1 and 2, or a section, as in Figs. 3, 4, and 5.

What I claim as my invention, and desire to secure by Letters Patent, is—

1. The combination of a device for containing glass in a molten state, an outlet thereto in the form of a projecting conduit, a connection of glass between the conduit and the containing device and means for maintaining the glass connection plastic, substantially as specified.

2. A device for containing glass in a molten state, an outlet thereto in the form of a projecting conduit, said outlet being free from any internal obstruction and provided with means for adjusting its outer end, and means for maintaining said conduit hot to permit the flow of molten glass therethrough, substantially as specified.

3. A device for containing glass in a molten state, an outlet thereto in the form of a projecting conduit, said outlet being free from any internal obstruction and provided with means for adjusting its outer end, a connection of glass between said conduit and containing device, and means for maintaining the glass connection plastic, substantially as specified.

4. A device for containing glass in a molten state, an outlet in the form of a projecting conduit, said outlet being free from any internal obstruction and provided with means for adjusting its outer end, and flanges on said device engaging the projecting conduit, substantially as specified.

5. A device for containing glass in a molten state having an outlet in the form of a conduit made in two sections, the inner one having its end above the bottom of the device and the outer one being adjustable, said outlet being free from any internal obstruction and provided with means for adjusting its outer end, and means for maintaining said conduit hot to permit the flow of glass therethrough, substantially as specified.

6. The combination with a device for containing glass in a molten state, of an outlet in the form of a conduit, said conduit being free from any internal obstruction, means for adjusting the outer end of said conduit, and
5 a heating-chamber for the projecting portion of said conduit, substantially as specified.

In testimony whereof I have signed my name to this specification in the presence of two subscribing witnesses.

HOMER BROOKE.

Witnesses:
 JOHN C. GROUT,
 W. LAIRD GOLDSBOROUGH.